(12) United States Patent
Jessberger et al.

(10) Patent No.: US 6,655,348 B1
(45) Date of Patent: Dec. 2, 2003

(54) PORT SYSTEM, ESPECIALLY AN INDUCTION MANIFOLD FOR AN INTERNAL COMBUSTION ENGINE

(75) Inventors: Thomas Jessberger, Rutesheim (DE); Arthur Klotz, Remseck (DE); Rudolf Leipelt, Marbach (DE); Stefan Maier, Besigheim (DE); Holger Paffrath, Ludwigsburg (DE); Herbert Pietrowski, Pleidelsheim (DE); Achim Rehmann, Kieselbronn (DE); Robert Vaculik, Marbach (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/762,058
(22) PCT Filed: Aug. 2, 1999
(86) PCT No.: PCT/EP99/05557
§ 371 (c)(1), (2), (4) Date: Apr. 30, 2001
(87) PCT Pub. No.: WO00/08320
PCT Pub. Date: Feb. 17, 2000

(30) Foreign Application Priority Data

Aug. 1, 1998 (DE) .......................................... 198 34 836

(51) Int. Cl.$^7$ .................................................. F02B 31/05
(52) U.S. Cl. ...................................... 123/308; 123/432
(58) Field of Search ................................. 123/306, 308, 123/432

(56) References Cited

U.S. PATENT DOCUMENTS 4,823,748 A * 4/1989 Ampferer et al. ........... 123/336

* cited by examiner

Primary Examiner—Henry C. Yuen
Assistant Examiner—Arnold Castro
(74) Attorney, Agent, or Firm—Crowell & Moring LLP

(57) ABSTRACT

A duct system suitable for use as an intake manifold for an internal combustion engine, including flap valves (13) for selective opening and closing of the ducts. The positions of the valves are continuously adjustable in order to produce a swirl in the flow of combustion air. To achieve this, a high degree of angular precision is required in the positioning of the valves. Intake manifold manufacturing tolerances need to be compensated during assembly of the valves. A valve adjusting mechanism is provided in mechanical couplings (23) of the valve linkage between the position adjusting motor (19) and the flap valves (13).

16 Claims, 4 Drawing Sheets

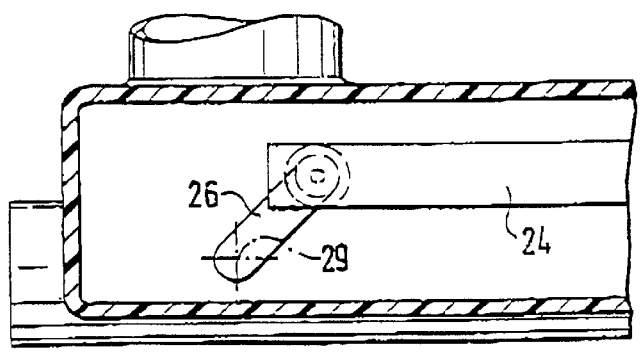
FIG. 7
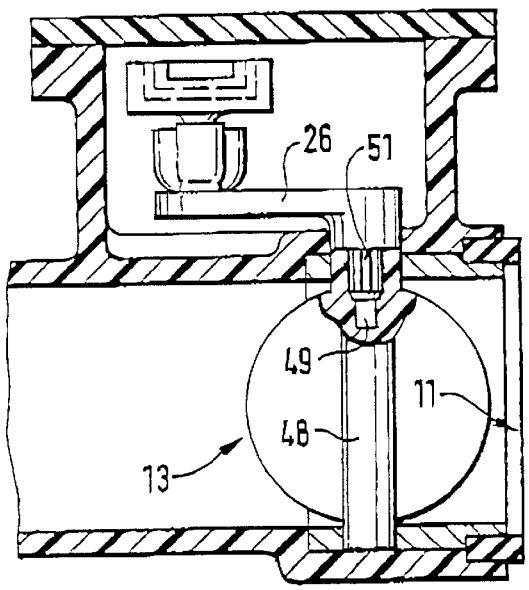
FIG. 9
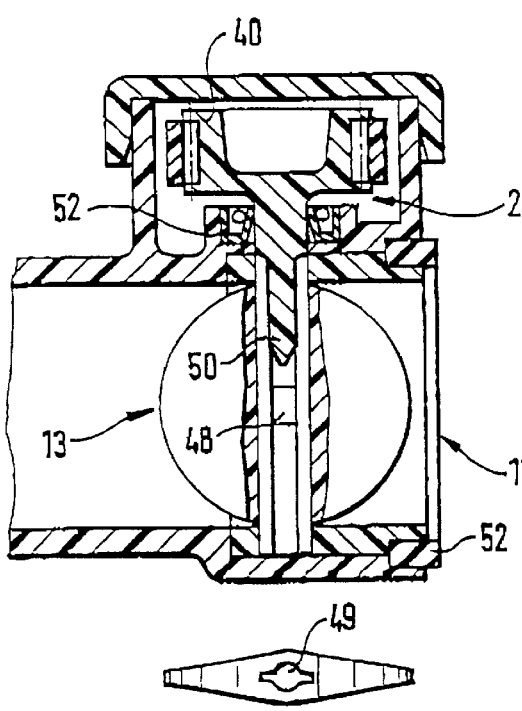
FIG. 8
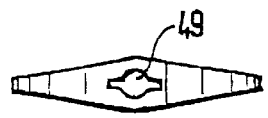

PORT SYSTEM, ESPECIALLY AN INDUCTION MANIFOLD FOR AN INTERNAL COMBUSTION ENGINE

BACKGROUND OF THE INVENTION

The invention relates to a duct system, particularly for use as an intake manifold for an internal combustion engine, with flap valves in the individual intake ducts to the cylinders. The invention further relates to a process for manufacturing the described intake manifold.

Such an arrangement of flap valves in the individual intake ducts of an intake manifold is disclosed, for instance, in DE 38 43 509. Each of the cylinders has two separate intake channels for the combustion air. The flap valves permit the closing of one of the intake channels to the cylinders, which makes it possible to reduce the effective intake cross section for the cylinders in the partial load range of the engine. The flap valves may be controlled by means of a push rod, which is moved via a flap valve actuator. The flap valves move against a mechanical stop. As a result, they can only be operated in the open or closed positions. The elasticity of the connecting rod is deliberately used to compensate for manufacturing tolerances through deformation in the stop positions of the flap valves.

The disadvantage of this known technical solution is that the flap valves can assume only two operating states. It would be desirable, however, if the flap valves were continuously adjustable with defined valve positions. For a continuous operation of the valves, the compensation of the tolerances by means of the elastic connecting rod would have to be eliminated. This would be possible only if the intake manifold or the control components were produced with very close manufacturing tolerances, which is not economically feasible.

SUMMARY OF THE INVENTION

The object of the invention is to provide an intake manifold with continuously adjustable flap valves, the production of which is economically competitive with the known solutions for flap valves. This object is attained by the features of by the invention as described and claimed hereinafter.

ADVANTAGES OF THE INVENTION

The intake manifold according to the invention has flap valves that are arranged in the intake channels of the intake manifold between the plenum and the cylinder-side outlet. The flap valves are controlled, for example, by valve cranks or gears. An actuator transmits the switching power, for instance through a rod assembly via the control, to the flap valves. The actuator must ensure the continuous adjustability of the valves. The mechanical couplings between valve gear, flap valves and actuator must be free of play. Only this makes it possible to obtain a precisely defined valve position as a function of the actuator position. To ensure that the flap valves have always the same position in relation to one another, the manufacturing tolerances in the intake manifold and the flap valve system must be compensated. For this purpose an adjustment is provided, which is preferably integrated in one of the mechanical couplings. The adjustment must be made in such a way that the position of each individual flap valve can be changed and subsequently fixed.

If the flap valves are arranged in the vicinity of the cylinder intakes, the precisely defined position of the valves can be used to produce a swirl in the flow within the combustion chamber of the cylinder. This has the advantage that a better mixture is formed in the partial load range of the engine, which can reduce fuel consumption and harmful emissions. The progressive adjustability further makes it possible to arrange flap valves in all intake channels leading to the cylinders. Of course then not all of the valves may be fully closed, since the air supply would in this case be completely shut off.

An advantageous embodiment of the inventive concept provides that the adjustment be made directly on the actuator. This may be accomplished, for instance, by means of a clamping plate into which the individual control rods to the valve cranks are clamped. This has the advantage that the adjustment can be mounted in the center of the cylinder-side intake manifold flange so that it is readily accessible. This makes it easier to readjust the flap valves during maintenance work.

A particular embodiment of the invention provides that the control rods be made of a strand-like semi-finished part on which a bushing is mounted as a joint, which is inserted onto bearing pins of the control. The control rods may for instance be made of a wire, the ends of which are coiled into helical springs. The bushing is pressed into the helical winding. Also feasible is a U-profile that is fixed directly to the bushing, for instance by a soldered connection. The use of semi-finished parts for the valve gear increases the economic efficiency of the proposed solution.

If the adjustment is provided on the flap valve actuator, it is advantageous to make the distance between the rotary axis of the actuator and the clamping elements and between the flap valve axes and the valve controls equal in length. As a result the control rod executes a purely translatory movement when the flap valves are operated. The clamping elements on the actuator can therefore be rigid since no rotational relative movements occur between the control rods and the actuator.

In another variant of the invention, the adjustment is integrated in the mechanical coupling between the drive of the flap valves and the power transmission. This arrangement has the advantage that power transmission can be effected through a single component, e.g. a connecting rod. An advantageous variant in this type of construction is a toothed belt for power transmission. Gears are used as drives, and the adjustment may be realized in that the gear teeth are rotated and fixed on a base body. It is likewise possible to effect the positional fixation between the valve axis and the gear. Since the toothed belt is a standard component, it is an extremely cost-effective option to ensure power transmission between the actuator and the flap valves.

According to one particular embodiment of the invention, the control of the flap valves is ensured by dual levers that are coupled with two cable pulls at their ends. The flap valves can be adjusted by means of clamping connectors at the ends of the dual levers. Power transmission by cable pulls has the advantage that the actuator may be placed at any point within the engine compartment by redirecting the cables. This is particularly advantageous if no installation space for the actuator can be provided near the intake manifold.

In a further variant of the invention the adjustment is provided in the mechanical coupling between the flap valve axis and the valve cranks or gears acting as the control. The valve crank may for instance be inserted into a bore of the valve axle. The two components may be connected, in particular, by means of an adhesive bond. Alternatively, gear teeth may be provided in the plug-in connection between valve crank and valve axle. If a bonded connection is used, it is advantageously designed to be elastic. Since in the valve positions between the limit stops the forces acting between the valves are small, a defined position in the control range of the valves is ensured despite the elasticity of the bonded connection. In the stop positions of the valves, however, the elasticity of the bonded connection can additionally compensate tolerances to a limited extent. This solution thus combines the advantageous functional principles of the known solutions with those of the solution according to the invention.

In one particular embodiment the flap valves being used are assembly-injection molded valve modules that can be mounted on the intake manifold. This measure increases the economic efficiency of the solution.

To produce the intake manifold according to the invention a method is provided which permits efficient calibration of the flap valves during assembly. This is achieved by using a gauge or jig that brings the flap valves into the desired position relative to one another and to the actuator. After preassembly of the valve gear and the actuator, the adjustments can now be fixed. As a result, the positions of the flap valves relative to one another are unchangeable. Any manufacturing tolerances are automatically compensated. At the end of the assembly process, the gauge is removed again.

These and other features of preferred embodiments of the invention are set forth in the claims as well as in the description and the drawings. The individual features may be implemented either alone or together in the form of subcombinations in embodiments of the invention or in other fields of application and may represent advantageous embodiments that are protectable per se, for which protection is hereby claimed.

BRIEF DESCRIPTION OF THE DRAWINGS

Further details will now be described, by way of example, with reference to schematic embodiments depicted in the drawings in which:

FIG. 7 is a plan view of the control of the valve cranks by a single control rod accommodated in a control housing, FIG. 8 is a longitudinal section through an intake channel with an assembly-injection molded flap valve in which the adjustment is effected between the valve crank and the valve axle and is realized by gear teeth, and FIG. 9 is a section corresponding to FIG. 8 in which the connection between the valve axle and the control gear is realized by means of an adhesive bond.

DETAILED DESCRIPTION OF PREFERRED EMBODIMENTS

Figure 1:
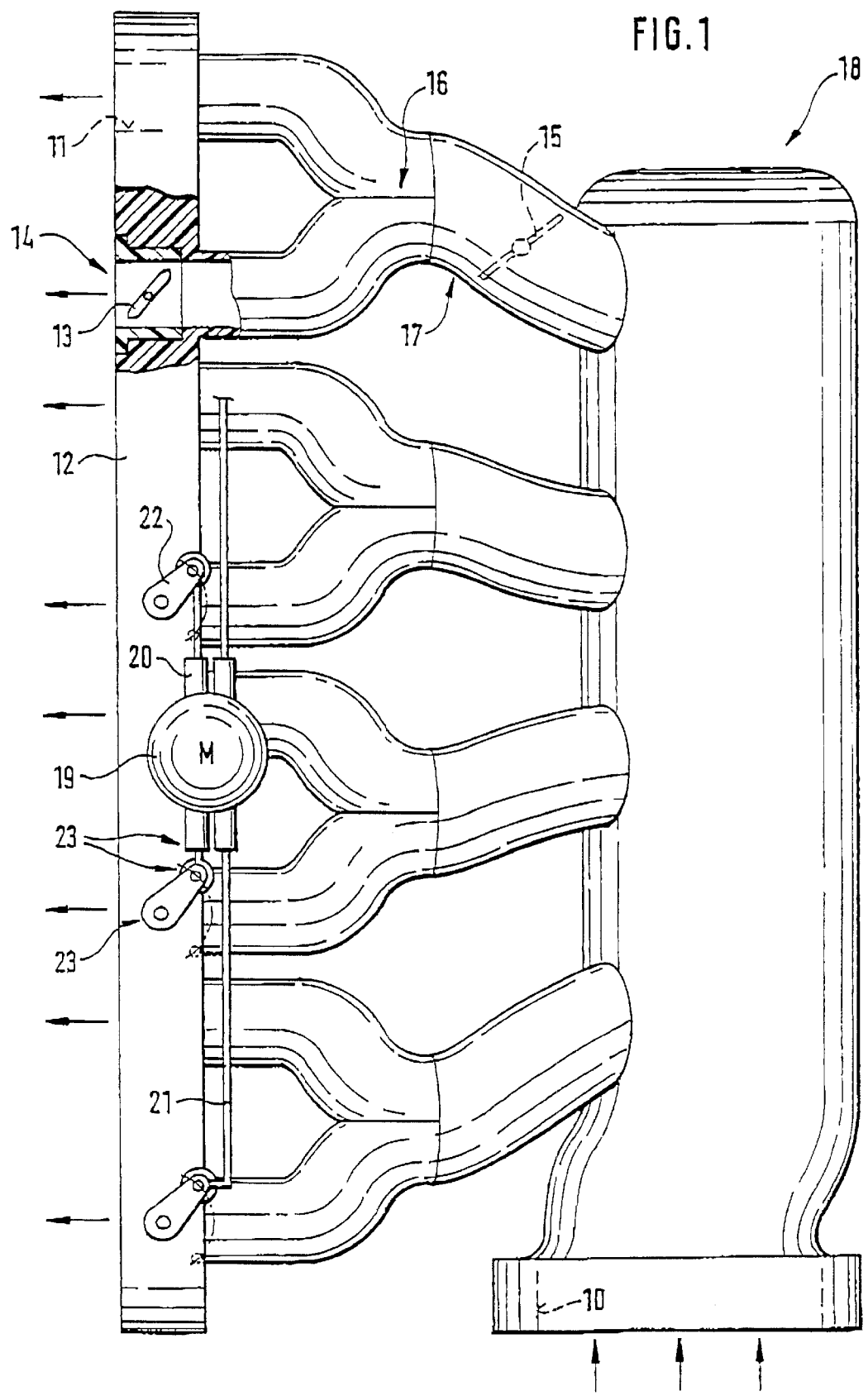
FIG. 1 is a schematic plan view of an intake manifold for a four cylinder internal combustion engine with the control rods according to the invention.

FIG. 1 schematically depicts an intake manifold on which a continuous valve adjusting mechanism is arranged. The intake manifold has an intake 10 and cylinder-side outlets 11, which are accommodated in a cylinder head flange 12. In one of the outlets 11 of each cylinder, respectively, a flap valve 13 is arranged, which is part of an assembly-injection molded valve module 14 that is installed in the cylinder head flange 12. Each cylinder thus has one unregulated and one regulated intake. The air supply in the regulated intake may be continuously adjusted or even completely shut off by the control mechanism. The control mechanism, however, could also be used to control throttle valves 15 disposed in an intake duct 17 between a branch 16 and a plenum 18.

The control mechanism comprises an actuator 19, adjustments 20, power transmissions 21 and throttle valves 13 with controls 22. The components of the control mechanism are connected with one another by mechanical couplings 23. The adjustment 20 may be integrated in one of the mechanical couplings.

Figure 2:
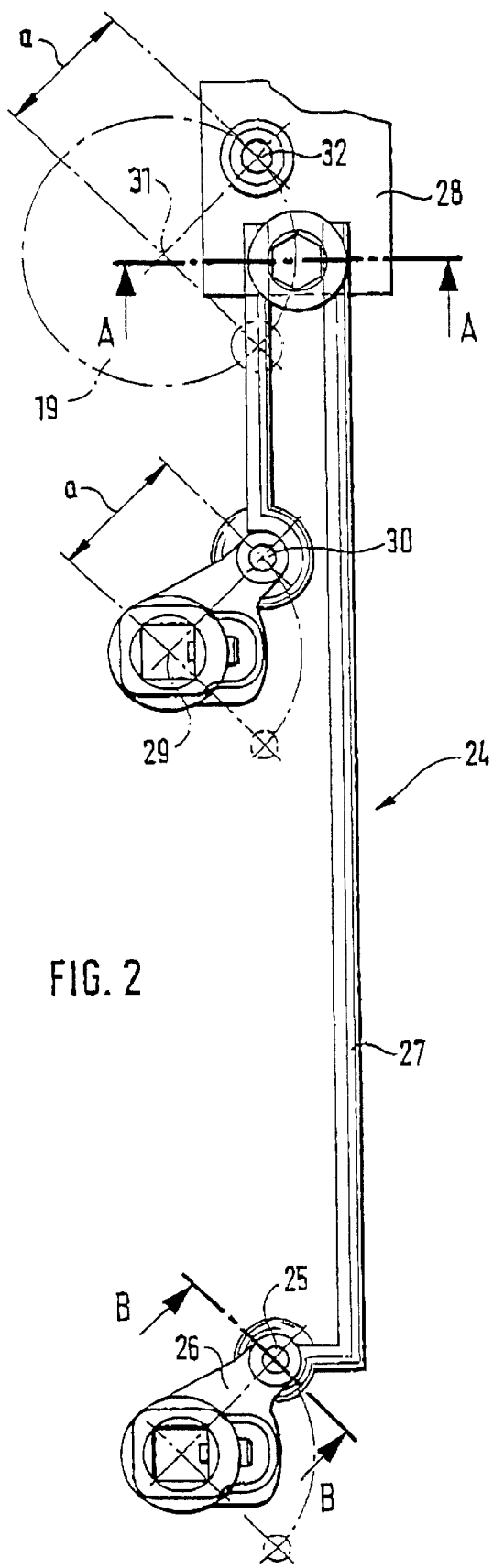
FIG. 2 shows a control rod with a clamping plate arranged between the center cylinders as an adjustment possibility for wire-shaped control rods.

FIG. 2 depicts a control mechanism for the flap valves 13 used in an arrangement as shown in FIG. 1. The transfer of power is effected via control rods 24. One control rod is provided for each flap valve. On the side of said valve the control rods 24 are connected with valve cranks 26 by a joint 25. The individual control rods 24 are comprised of a wire 27 and are brought together on a clamping plate 28. The clamping plate is connected with an actuator 19, which is indicated by broken lines. The length of the valve crank 26 results from a distance (a) between a valve axle 29 and a bearing pin 30 of the joint 25. This same distance (a) is realized between a rotary axis 31 of the actuator and a clamping plate seat 32.

Figure 3:
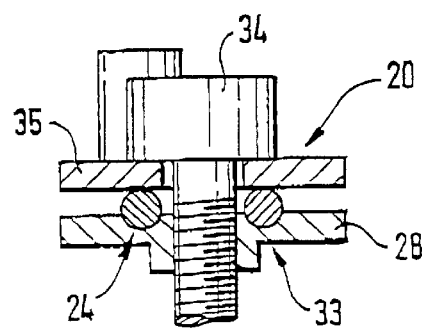
FIG. 3 is a section along line A—A in FIG. 2 illustrating the mode of operation of the adjustment at the clamping plate.

The mechanical coupling between control rods 24 and clamping plate 28 serves as adjustment 20 to calibrate the valve system (see FIG. 3). A clamping element 33 comprising the clamping plate, a screw 34 and a washer 35 is used for this purpose. The control rods are continuously axially displaceable in the clamping element so that tolerances may be compensated during assembly. Tightening screw 34 clamps the control rods, so that the control rod/clamping plate system forms a rigid unit.

Figure 4:
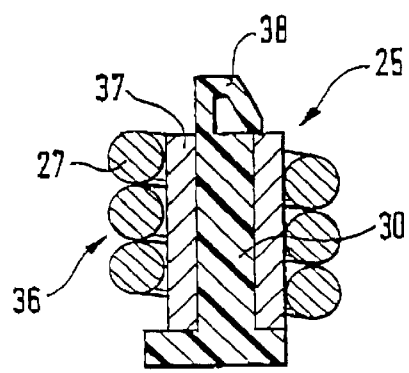
FIG. 4 is a section along line B—B in FIG. 2 illustrating the joint between control rod and valve crank.

An example of the design of joint 25 between control rod 24 and valve crank 26 is shown in FIG. 4. The wire 27 of the control rod is coiled to form a helical spring-shaped winding 36. A bushing 37 is inserted into this winding. Bushing 37 interacts with bearing pin 30 on the valve crank. To prevent slipping off of the control rod, bearing pin 30 may be provided with a snap hook 38.

Figure 5:
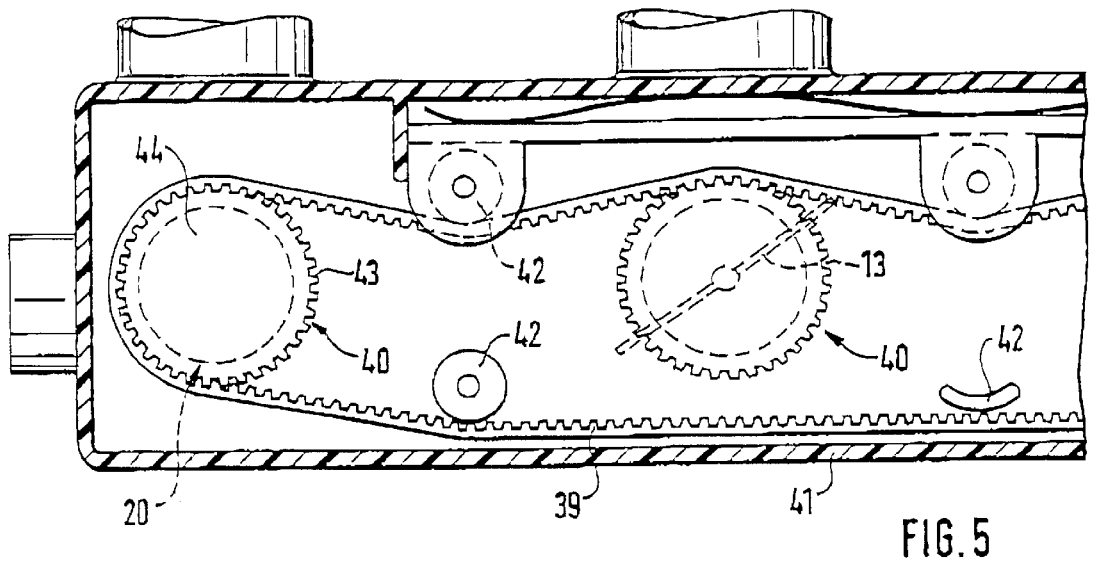
FIG. 5 is a plan view of the arrangement of the control mechanism within a control box formed by gears connected with the valve axles and a toothed belt.

FIG. 5 depicts a valve actuator effected by means of a toothed belt 39. The toothed belt engages gears 40, which are connected with the flap valves 13. The control unit for the flap valves is accommodated in a box-like housing 41. In this housing, tensioning means 42 are provided to prevent slipping of the belt teeth on the teeth of the gear wheel 40. The adjustment 20 is realized by a shaft/hub connection between gear teeth 43 and a base body 44 of gear 40. During assembly an adjustment of the flap valves may be carried out by effecting an angular displacement between the base body and the gear teeth. After assembly, this adjustment must be fixed. This may be accomplished, for instance, by adhesive bonding.

Figure 6:
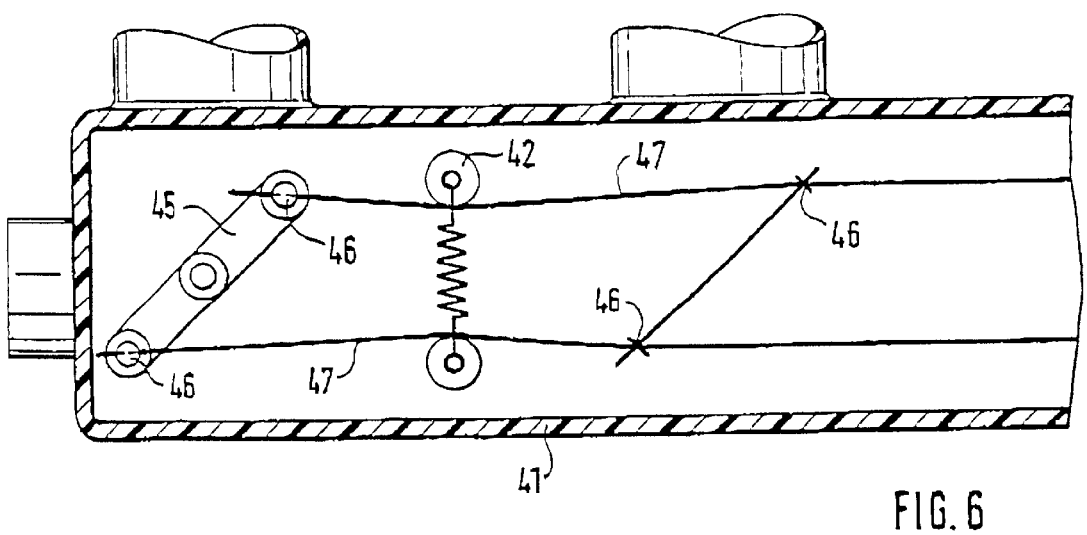
FIG. 6 is a plan view of a control mechanism within a control box formed by dual levers on the valve axis, which are controlled by cable pulls.

The control unit according to FIG. 6 is also disposed in housing 41. The flap valves have dual levers 45 to which cable pulls 47 are fixed via clamping joints 46. In addition, tensioning means 42 may be fixed to the cables.

In FIG. 7, the valve cranks 26 are actuated by a single control rod 24. In this version, the flap valves can be adjusted only at the valve axle 29. Possible structural embodiments are shown in FIGS. 8 and 9. These adjustment options can of course also be combined with the control mechanisms shown in FIGS. 1 to 6.

FIG. 8 is a section through outlet 11 of an intake manifold. The assembly-injection molded flap valve 13 is inserted into the opening of the outlet. A valve shaft 48 has a receiver hole 49 with an elongated cross section. The receiver hole mechanically communicates with control 22 for the flap valve, which control is formed by gear 40. Sealing means 52 are provided both on the control and in a groove in the cylinder head flange 12. The control may be inserted into receiver hole 49 by means of an arbor 50. Between the arbor and the receiver hole a structural gap is provided so that it is still possible to adjust the flap valve 13. The gap between location hole 49 and arbor 50 is filled with an elastic compound. Once this compound is cured, the adjusted flap valve is fixed.

FIG. 9 shows the outlet of the intake duct with an installed assembly-injection molded flap valve 13 corresponding to FIG. 8. The control, however, is realized by valve crank 26 with a multi-tooth profile 51 which is inserted into the receiver hole 49 of the valve shaft 48. The multi-tooth profile 51 is oversized compared to the receiver hole 49 so that during assembly of the valve crank 26 the teeth of the profile dig into the walls of the receiver hole. The flap valves must be adjusted prior to that.

It is likewise feasible to provide corresponding gear teeth in the receiver hole 49. If the gear teeth of the multi-tooth profile 51 and the receiver hole 49 are sufficiently fine, an adjustment of the valves may be effected in small angular increments.

What is claimed is:

1. A duct system for use as an intake manifold for an internal combustion engine, said duct system comprising at least one inlet, at least two intake channels with outlets, at least one of said channels having a pivotably mounted flap valve installed therein, an actuator which produces a switching force, a force transmitting mechanism which transmits the switching force from the actuator to a control member associated with each flap valve to turn the flap valve such that the flap valve is continuously adjustable to any position between fully open and fully closed; wherein mechanical couplings are provided between the flap valves, the control members, the force transmitting means, and the actuator which are at least essentially free of play, and wherein a position adjusting mechanism is provided for each individual flap valve at one of the mechanical couplings.

2. A duct system according to claim 1, wherein the force transmitting mechanism is a drive rod mechanism and the control member comprises a valve crank.

3. A duct system according to claim 2, wherein the valve crank is fixedly connected with the flap valve.

4. A duct system according to claim 2, wherein the drive rod mechanism is pivotably connected at one end to the valve cranks, and the other end of the drive rod is secured to to the actuator by a clamp, and wherein said clamp simultaneously serves as the position adjusting mechanism.

5. A duct system according to claim 2, wherein the drive rod mechanism is comprised of elongated, flexible, semi-finished parts, and the mechanical coupling between the drive rod mechanism is comprised of a bushing mounted on a bearing pin on the valve crank and received in an end of one of said elongated, flexible parts.

6. A duct system according to claim 5, wherein the elongated, flexible semi-finished part is a section of wire having one end wound into a helical coil which serves as a receptacle for the bushing.

7. A duct system according to claim 1, wherein the actuator executes a rotary movement and the mechanical coupling between the actuator and the force transmitting mechanism is spaced from axis of rotation of the actuator a distance equal to that between the axis of rotation of the pivotable flap valve and the mechanical coupling between the force transmitting mechanism and the valve crank.

8. A duct system according to claim 7, wherein the axis of rotation of the actuator and the axis of rotation of the pivotable flap valve are parallel to each other.

9. A duct system according to claim 1, wherein the adjusting mechanism is integrated into the mechanical coupling between the force transmitting mechanism and the control member.

10. A duct system according to claim 1, wherein the force transmitting mechanism comprises at least one toothed belt; each control member comprises a gear wheel having gear teeth engaged with teeth on said toothed belt, and each gear wheel comprises a central base body and annularly disposed gear teeth angularly displaceable relative to each other, and wherein said position adjusting mechanism is integrated into means for connecting the base body to the annularly disposed gear teeth.

11. A duct system according to claim 1, wherein the control member comprises dual levers fixedly connected with each pivotable flap valve, and the force transmitting mechanism comprises a pair of cable pulls, wherein each of the dual levers is mechanically coupled to one of the cable pulls by a clamp, and wherein the clamps simultaneously serve as the position adjusting mechanism.

12. A duct system according to claim 1, wherein the pivotable flap valves are mounted on axles, and the control members are valve cranks mechanically coupled to the axles to turn the valves, and wherein said adjusting mechanism is integrated into the mechanical coupling between the valve cranks and the valve axles.

13. A duct system according to claim 12, wherein the valve cranks are adhesively bonded to the valve axles of the flap valves.

14. A duct system according to claim 13, wherein the valve cranks are adhesively bonded to the valve axles by an elastic adhesive.

15. A duct system according to claim 14, wherein said elastic adhesive is a silicone elastomer adhesive.

16. A duct system according to claim 1, wherein the flap valves comprise assembly injection molded modules installed in the outlets of the intake channels.

* * * * *